United States Patent [19]

Cole

[11] Patent Number: 4,998,056

[45] Date of Patent: Mar. 5, 1991

[54] BATTERY CHARGER

[75] Inventor: S. W. Cole, Gainesville, Ga.

[73] Assignee: Makita Corporation of America, Buford, Ga.

[21] Appl. No.: 331,700

[22] Filed: Mar. 31, 1989

[51] Int. Cl.$^5$ .............................................. H02J 7/04
[52] U.S. Cl. ...................................... 320/35; 320/23; 320/40
[58] Field of Search .................................. 320/22-24, 320/35, 36, 39, 40

[56] References Cited

U.S. PATENT DOCUMENTS

| | | | |
|---|---|---|---|
| 3,289,065 | 11/1966 | Dehmelt et al. | 320/40 |
| 3,597,673 | 8/1971 | Burkett et al. | 320/20 X |
| 3,876,921 | 4/1975 | Bigbee, III | 320/20 |
| 3,911,351 | 10/1975 | Saslow | 320/35 X |
| 3,935,525 | 1/1976 | Elson et al. | 320/22 X |
| 3,938,021 | 2/1976 | Kosmin | 320/40 |
| 3,969,665 | 7/1976 | Rowas | 320/40 X |
| 4,163,934 | 8/1979 | Lawn | 320/23 |
| 4,297,630 | 10/1981 | Mullersman | 320/35 |
| 4,354,148 | 10/1982 | Tada et al. | 320/20 |
| 4,503,378 | 3/1985 | Jones et al. | 320/40 X |

Primary Examiner—R. J. Hickey
Attorney, Agent, or Firm—James B. Middleton

[57] ABSTRACT

A battery charger for nickel-cadmium batteries uses a silicon controlled rectifier to rectify the alternating supply voltage. The silicon controlled rectifier has a current applied to its gate near the end of each positive half-wave, at a point after the voltage is low enough not to injure the battery being charged. An electronic timer is used to select the desired point in the half-wave, time being dependent on the charging of a capacitor. To terminate the charging, the circuit to the capacitor is opened. Termination of charging may be by monitoring the temperature of the battery and terminating on reaching a predetermined temperature, or by monitoring the battery voltage and terminating when the change in the voltage reverses.

5 Claims, 2 Drawing Sheets

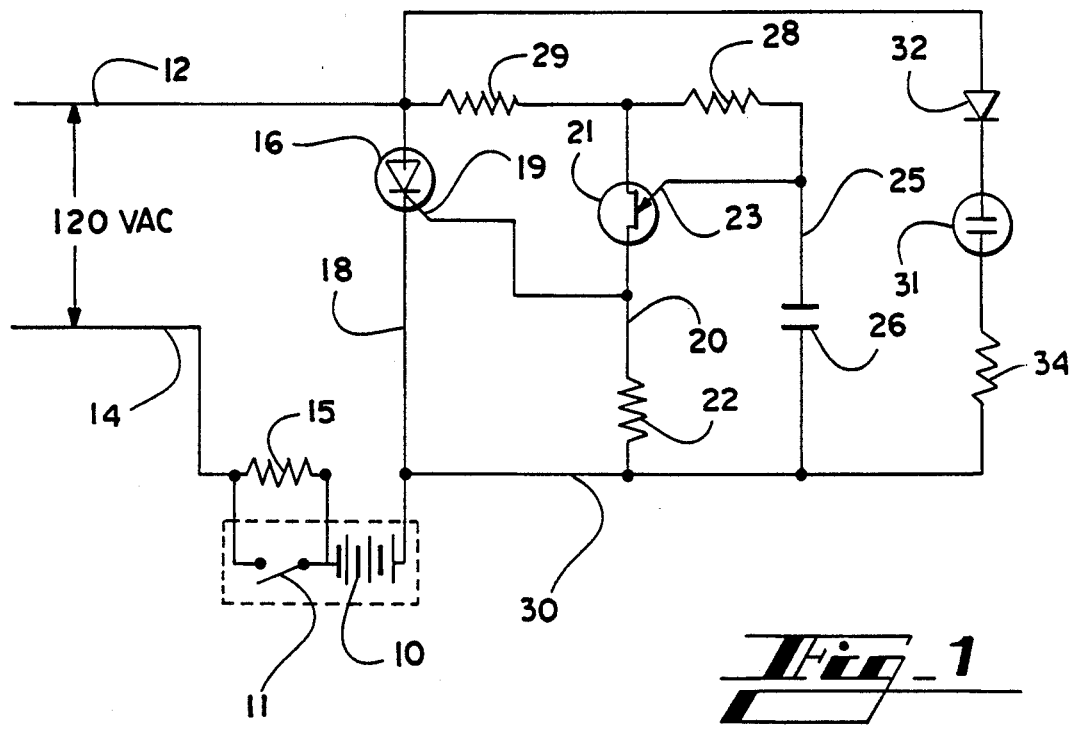
Fig_1
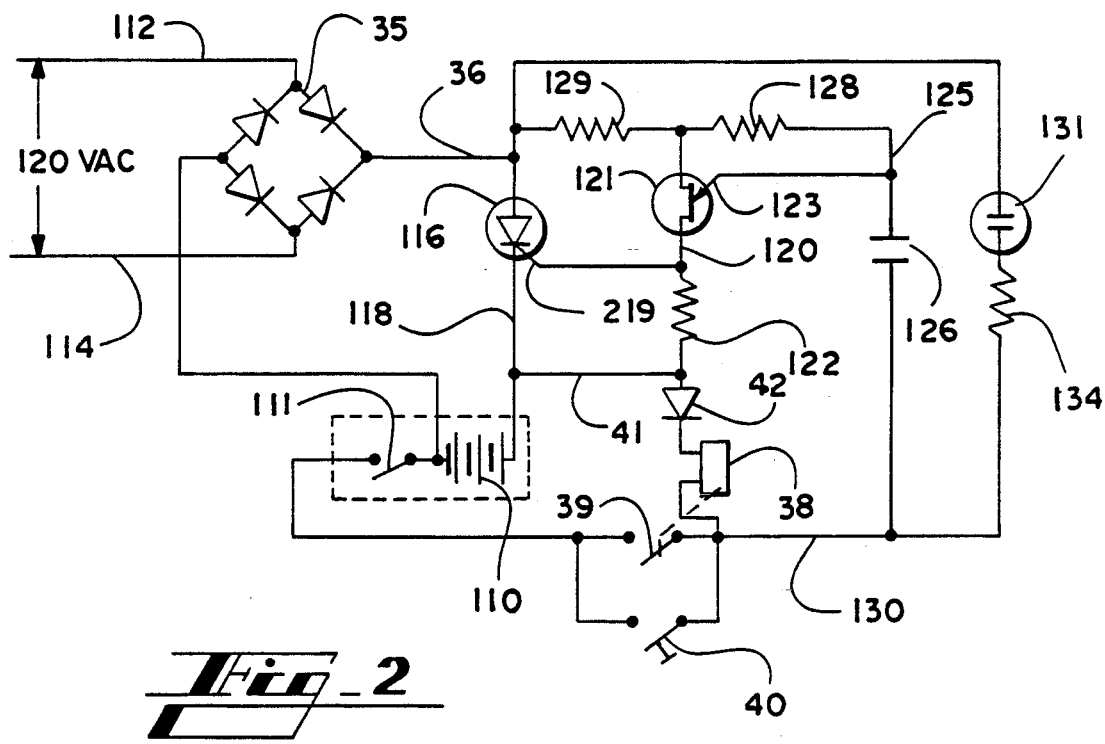
Fig_2

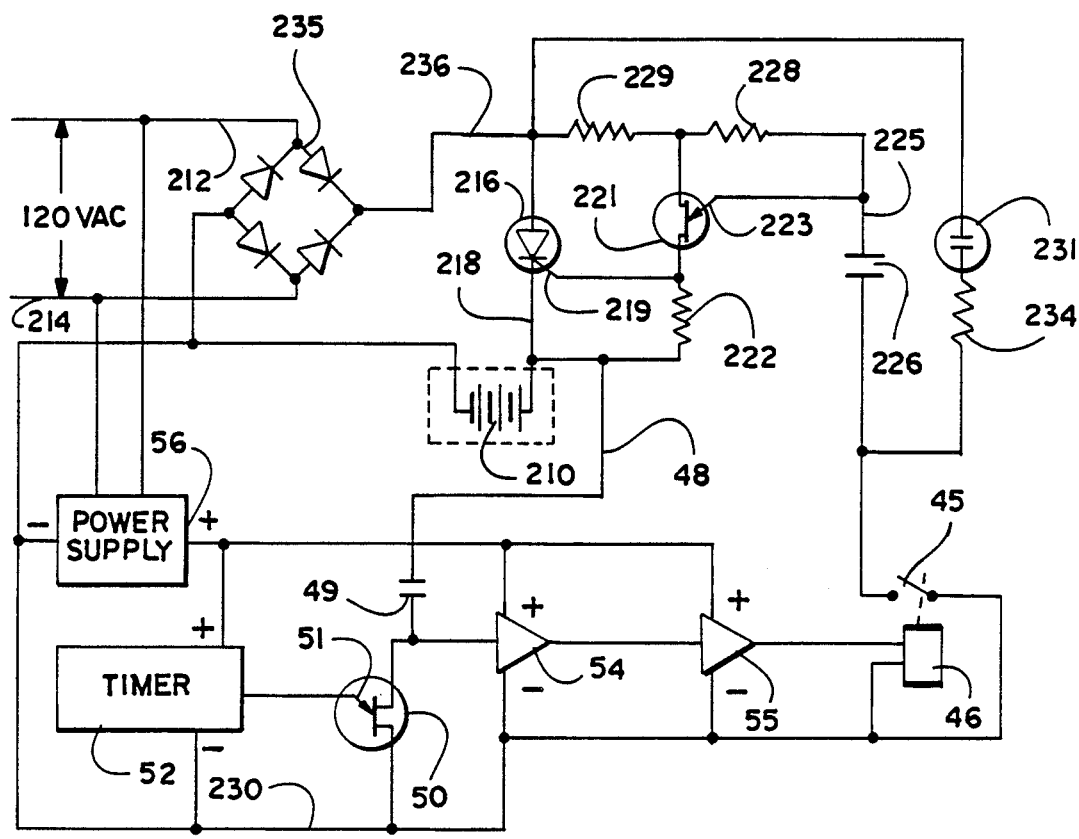
Fig_3

BATTERY CHARGER

INFORMATION DISCLOSURE STATEMENT

Nickel-cadmium batteries and the like are in very common use, and such batteries are frequently used in portable power tools. While portable power tools and the like have been well accepted in the marketplace, there is a severe disadvantage in that the batteries require about an hour to recharge. While the batteries are recharging, the tool is inoperable unless one invests in a second battery for use with the same tool. It will be recognized that, in any event, faster charging of the battery would yield greater efficiency with the tool.

Prior art battery chargers for nickel-cadmium batteries comprise a transformer to lower the voltage to the range of the battery voltage. The lower voltage is then rectified, and sometimes adjusted to be sure the charging voltage is in the desired range. The use of a transformer drastically increases the weight of the battery charger, and of course the circuitry is increased because of the necessity to rectify the voltage, and stabilize the voltage.

SUMMARY OF THE INVENTION

This invention relates generally to battery chargers, and is more particularly concerned with a battery charger for nickel-cadmium batteries using circuit means for selecting the desired point in a pulsating voltage, and means for terminating the charging.

The present invention provides a battery charger operating from a standard electric power supply, such as 120 v.a.c., the AC voltage being rectified for providing a pulsating DC voltage. A small portion of the cycle is utilized, the portion being in the time just before the pulsating voltage reaches zero volts. To achieve the desired charge without damaging the battery, the maximum voltage is selected to be low enough not to damage the battery. At this maximum voltage, the supply voltage is connected to charge the battery, and remains so connected until the voltage falls below the battery voltage.

In one embodiment of the invention, half-wave rectification is used, so each cycle of the supply voltage will provide one pulse for charging the battery. In another embodiment of the invention, full-wave rectification is used, and each cycle of the alternating supply voltage provides two pulses for charging the battery. In both embodiments, circuit means is caused to conduct in a preselected portion of the half-wave, and current is supplied to the battery from the time the circuit means is caused to conduct until said half-wave voltage falls below the battery voltage.

When the battery is charged, the charging must be terminated. The present invention contemplates both the use of temperature of the battery as a signal to terminate the charging, and a reversal in the change in voltage as the signal to terminate the charging.

BRIEF DESCRIPTION OF THE DRAWINGS

These and other features and advantages of the present invention will become apparent from consideration of the following specification when taken in conjunction with the accompanying drawings in which:

FIG. 1 is a schematic circuit diagram illustrating an embodiment of the present invention utilizing half-wave rectification and temperature as the signal for charge termination;

FIG. 2 is a schematic circuit diagram illustrating an embodiment of the present invention utilizing full-wave rectification and temperature as the signal for charge termination; and, FIG. 3 is a schematic circuit diagram illustrating an embodiment of the present invention utilizing full-wave rectification, and reversal of voltage change as the signal for charge termination.

DETAILED DESCRIPTION OF THE EMBODIMENTS

Referring now more particularly to the drawings, and to those embodiments of the invention here presented by way of illustration, FIG. 1 illustrates a battery 10 to be charged. The battery 10 has a thermostat 11 in conjunction therewith. As is known to those skilled in the art, the temperature of a Nickel-Cadmium battery (hereinafter referred to as a NiCad battery) increases during the charging cycle. As the battery approaches full charge, the increase in temperature turns sharply upward. The thermostat 11 can therefore be set to open during the sharp increase in temperature rise, and the charge termination will be rather accurate.

A source of power is provided on the lines 12 and 14, the voltage being indicated as 120 VAC, though it will be readily understood that other available voltages are equally usable. The line 14 is connected to the battery 10 through a resistor 15, the resistor 15 being in parallel with the thermostat 11. The line 12 is connected to the battery 10 through the silicon controlled rectifier (SCR) 16, in the line 18. It should thus be understood that, when the alternating current flows in one direction, current can flow from the line 12, through the SCR 16 when the SCR is conducting, to the battery 10, thence through the thermostatic switch 11 and resistor 15, to line 14. However, when the alternating current flows in the opposite direction, the flow of current will be blocked by the SCR 16.

With the above in mind, it will be seen that selective triggering of the SCR 16 will determine the duration and amount of power allowed to reach the battery 10. More particularly, the SCR 16 will prevent charging of the battery 10 until a current is applied to the gate 19; then, the SCR 16 will conduct until the voltage on the line 12 falls below the battery voltage. The control over the battery charging is therefore in the control of the current applied to the gate 19.

The gate 19 is connected to a line 20, the line 20 containing a unijunction transistor (UJT) 21 in series with a resistor 22. The emitter 23 of the UJT 21 is connected to a circuit branch 25 having a capacitor 26 and a resistor 28 in series. The resistor 28 is also in series with a resistor 29 in the line 12.

With the above description in mind, it will be understood that current will flow through the line 12, through the resistors 29 and 28, through the branch 25 to charge the capacitor 26, then to the line 30. While the current will then flow through the battery 10, the current will be negligible. The time required to charge the capacitor 26 amounts to a delay in sending the charging current to the battery 10; and, once the capacitor 26 is charged, the voltage will be placed on the emitter 23 of the UJT 21 to cause the UJT to conduct. The resistor-capacitor network therefore acts with the UJT 21 to provide a timing trigger for the SCR 16.

One base of the UJT 21 is connected between the resistors 28 and 29 which act as a voltage divider. Thus, when the UJT 21 conducts, current will flow in the line 20, so there will be a triggering voltage on the line 20, causing a current flow to the gate 19 of the SCR 16, causing the SCR 16 to conduct. As was discussed above, this will allow charging current to the battery 10.

After triggering the UJT 21, the capacitor 26 will be discharged, thereby removing the potential from the emitter of the UJT 21, which in turn removes the potential from the gate 19 of the SCR 16. As a result, when the voltage on line 12 falls below the battery voltage, the SCR 16 will be turned off and will remain off until another triggering voltage on the gate 19 as previously described. Each positive half-wave of the voltage on the lines 12 and 14 will therefore provide a small pulse of charging current to the battery 10.

When the battery 10 is fully charged, the temperature of the battery will turn up sharply, so the temperature will be sufficient to cause the thermostat 11 to open. It will be noted that the battery 10 is still connected to the line 14, but the connection is through the resistor 15 which is high enough to prevent more than a trickle of current. This current is small enough that the battery 10 would not be damaged even if such current continue for an extended period of time. The resistor 15 serves the function of maintaining a small supply of heat at the battery 10 in order to hold the thermostat 11 open.

FIG. 1 includes an indicator light 31 to indicate when the battery 10 is being charged. A diode 32 is in series so the light 31 can be lighted only on the same positive half-waves that charge the battery 10, and a resistor 34 is also in series to limit the current through the light. Thus, the light 31, which is a gas discharge lamp, will light while the thermostatic switch 11 is closed. When the switch 11 opens, the resistor 15 is of a sufficiently high value that the light 31 can no longer light.

Attention is next directed to FIG. 2 of the drawings which shows a battery charger providing full wave rectification. The circuitry for providing the charging current for the battery is the same as in FIG. 1 and will not be described in detail. Equivalent parts in FIG. 2 carry the same numbers as in FIG. 1, with a 1 prefix. The termination circuitry is somewhat different because of the full-wave rectification.

Looking at FIG. 2 in detail, power is supplied on lines 112 and 114 which are connected to a full wave rectifier 35. The positive side of the rectifier 35 leads to line 36 which includes the resistors 129 and 128. Between these resistors, the line 120 is connected, the line 120 including the UJT 121 and resistor 122. After the resistor 128, the branch 125 is connected, and contains the capacitor 126. The opposite side of the capacitor 126 is connected to the line 130. It will also be noted that the gas discharge lamp 131 is connected as in FIG. 1, but without the diode 32 since both half-waves are utilized in the embodiment of FIG. 2.

It will be remembered that the capacitor 126 must be charged to provide the triggering voltage on the UJT 121. It will be noted that there is a relay 38 having a normally open contact 39, the contact 39 being in the line 130. Thus, the capacitor 126 cannot charge until the relay contact 39 is closed; however, the relay 38 is energized by current from the battery 110 flowing from the positive pole through line 41 and diode 42, and from the negative pole through the thermostat 111 and the contact 39. A starter switch 40 is connected in parallel with the contact 39, the switch 40 being a normally open, manually operated, momentary contact pushbutton.

In operation of the charger in FIG. 2, the switch 40 must be momentarily closed, and this will allow the capacitor 126 to charge. When the charge reaches the proper level, the UJT will be fired to cause the SCR 116 to conduct, thus charging the battery 110. Momentarily closing the switch 40 also energizes the relay 38. When the relay 38 is energized, the contact 39 will be closed. Since the contact 39 is parallel to the switch 40, the contact 39 acts as a self hold for the relay 38. The diode 42 prevents the charging of the capacitor 126 through the relay 38 and battery 110, to the line rectifier 35. When the battery 110 is fully charged, the thermostatic switch 111 will open, breaking the circuit to the line 130 and removing the potential from one side of the relay 38. The relay 38 will therefore drop and the contact 39 will open. The SCR 116 will not be caused to conduct until the switch 40 is again closed to start the charging process.

The above described embodiments of the present invention use the rise in temperature as a signal to terminate the charging of a NiCad battery, and such a procedure works quite well for many battery chargers. It should be realized, however, that as the charging rate increases, it is more difficult to terminate the charging of a battery by monitoring temperature. One difficulty is that, since the rate of charge is high, the rate of temperature increase is also high. As a result, when the temperature increase makes a sharp upturn, the upturn is harder to detect with apparatus such as a thermostatic element.

NiCad batteries exhibit a peculiar voltage change during the charge cycle in that the voltage increases to a maximum, then begins to decrease. The maximum charge for the battery occurs at the apex of the curve; therefore, if one can detect the point at which the change in voltage decreases rather than increases one can terminate the charge cycle at precisely the right time. The embodiment of the present invention shown in FIG. 3 of the drawings is one arrangement for accomplishing such a procedure.

Again, the charging circuit shown in FIG. 3 is substantially the same as the charging circuits shown in FIGS. 1 and 2. The difference in FIG. 3 is the terminating means. Thus, FIG. 3 carries the same reference numerals as FIGS. 1 and 2 for equivalent parts, with a 2 prefix.

Looking briefly at the upper portion of FIG. 3, the lines 212 and 214 feed a full-wave rectifier 235. The positive output on line 236 is fed to an SCR 216 and to the relaxation oscillator including the resistors 228 and 229 and capacitor 226. A UJT 221 is connected between the resistors 228 and 229, the output of the UJT 221 acting to trigger the SCR 216. As before, the operation of the battery charger depends on charging of the capacitor 226; and, in the circuitry shown in FIG. 3, the capacitor 226 cannot charge until the switch 45 is closed. The switch 45 is a relay contact associated with the relay 46, so operation of the relay 46 must be understood.

Positive battery voltage is placed on the line 48 which is connected to the capacitor 49, so the capacitor 49 will reflect the voltage of the battery 210. The opposite side of the capacitor 49 is connected to one base of a UJT 50, the other base being connected to the line 230. Thus, when the UJT 50 is caused to conduct, the voltage of the capacitor 49 will be set to zero. The emitter 51 of the UJT 50 is connected to the output of a timer 52, so the UJT 50 is fired at regular intervals to set the voltage of the capacitor 49 to zero at regular intervals.

When the capacitor 49 has a voltage thereon, that voltage is fed to the operational amplifier (op-amp) 54. The op-amp 54 acts as a high impedance buffer for the second op-amp 55 which acts as a comparator. The op-amp 55 is designed to operate with hysteresis, so the op-amp 55 can compare each new voltage pulse with the previous voltage pulse. As long as each voltage sample from the capacitor 49 is equal to or higher than the preceding sample, the output from the comparator 55 will be positive, and the relay 46 will be energized. When a voltage sample is lower than the preceding sample, the output from the comparator will be zero, and the relay 46 will be deenergized.

The apparatus shown in FIG. 3 includes a power supply 56 for driving the timer 52 and the op-amps 54 and 55. Those skilled in the art will readily understand that the power supply 56 can be of conventional form, receiving input from the lines 212 and 214 and having an output of around 6 volts. The timer 52 and op-amps 54 and 55 are similarly conventional devices, and the desired items can be selected for the particular power needed.

It will therefore be understood that the present invention provides a battery charger that does not require a transformer to lower the supply voltage. Rather, the alternating supply voltage is rectified, and the rectified voltage is not connected to the battery to be charged until the cyclical voltage has reached its maximum and is moving down. When the voltage is low enough not to damage the battery to be charged, the supply is connected to the battery so the battery receives a charging pulse. The pulse is terminated when the supply voltage drops to the battery voltage.

To select the time for connecting the battery to the supply voltage, a relaxation oscillator is used to control a switch means such as a thyristor. The relaxation oscillator is timed with the supply voltage, and controls the switch means in the proper, timed, cycles. Obviously other timing trigger means will suggest themselves to those skilled in the art.

Termination of the charging can be accomplished through a signal indicating battery temperature, or through a signal indicating a reversal in the change of battery voltage. Thus, the present invention includes the use of a thermostatic switch to terminate the charging of the battery as one embodiment, and includes the use of voltage sampling and comparing means to detect the reversal of the change in battery voltage to terminate the charging of the battery.

The voltage sampling and comparing means shown in the drawings and described above is an analog system, but it will be recognized that a digital system can equally well be used. The input, analog, voltage will be connected to an analog-to-digital converter (A/D); and, the output from the A/D goes to both a latch and one input of a comparator. The output of the latch will go to the second input of the comparator. The comparator will therefore read the present voltage level from the A/D and the previous level from the latch. The output from the comparator can be fed to a flip-flop so that, as long as the present voltage is equal to or greater than the previous voltage, charging will continue. When the present voltage is less than the previous voltage, the flip-flop will be reset and charging will be terminated.

It will therefore be seen that the digital form of voltage detection is the equivalent of the analog voltage detection shown and described, and it is thought that these and other arrangements will be readily devised by those skilled in the art.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention and outlined in the appended claims.

I claim:

1. A battery charger for charging a battery from a supply of alternating current, said battery charger including rectifying means including at least one controllable rectifier connected in series with said battery, and gate means for selectively causing said rectifying means to allow current flow in one direction, timing trigger means for timing said gate means, and temperature responsive means for terminating the charging of said battery when said battery is fully charged, while said battery is connected in series with said rectifying means, said temperature responsive means including a thermostatic switch adjacent to and in thermal communication with said battery and connected in series therewith so that opening of said thermostatic switch reduces the current through said battery sufficiently that there is no further charging of said battery, and further including a relay means in series with said battery, normally open relay switch means for disabling said timing trigger means, and means for energizing said relay means.

2. A battery charger as claimed in claim 5, said means for energizing said relay means comprising starter switch means in parallel with said relay switch means.

3. A battery charger as claimed in claim 5, said thermostatic switch being connected to deenergize said relay means when said battery becomes sufficiently hot to operate said thermostatic switch.

4. A battery charger as claimed in claim 7, said timing trigger means including a resistor-capacitor network connected in parallel with said rectifying means, said resistor-capacitor network acting as a timing means for triggering said gate means, said timing trigger further including voltage divider means, a unijunction transistor in parallel with said rectifying means and between said voltage divider means, said unijunction transistor having an emitter connected to one side of said resistor-capacitor network, said rectifying means comprising a silicon controlled rectifier, said gate means being connected to one side of said unijunction transistor, the arrangement being such that a charge on said capacitor will cause said unijunction transistor to conduct allowing a current flow to said gate means for causing said silicon controlled rectifier to conduct, the time required for charging said capacitor being the delay for selecting the desired portion of the half-wave of alternating 5. A battery charger as claimed in claim 8, and further including an indicator lamp connected in parallel with said rectifying means for indicating when said battery is being charged.

* * * * *